Figure 1:
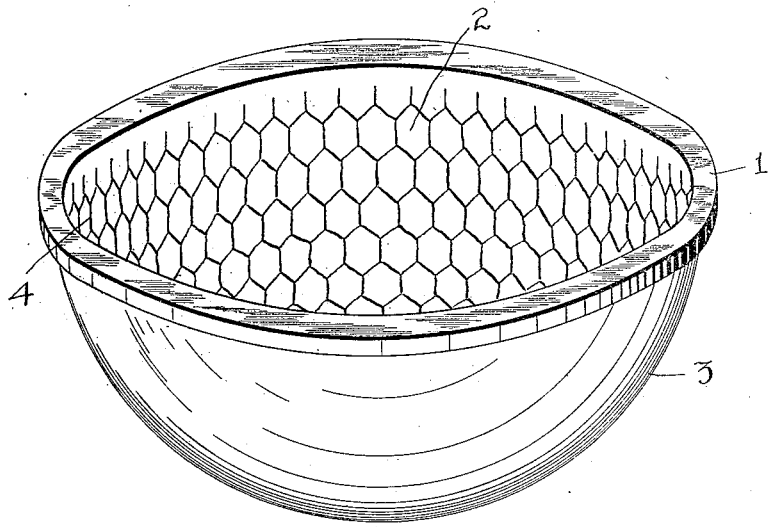
Figure 2:
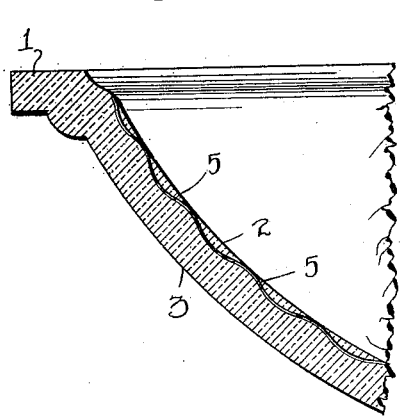
Figure 3:
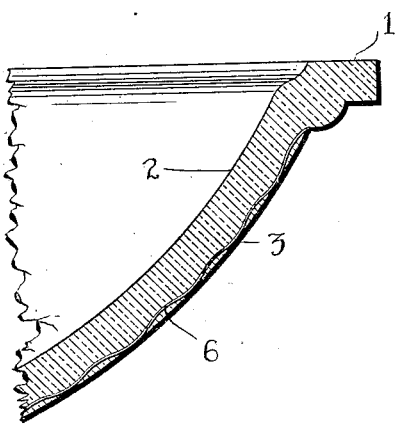

J. BEISWANGER.
REINFORCED GLASS ARTICLE OF MANUFACTURE.
APPLICATION FILED MAR. 3, 1915.

1,212,174.

Patented Jan. 16, 1917.

WITNESSES
Geo. A. Lewis
Charles D. Edwards

INVENTOR
John Beiswanger
BY
Stewart Perry
his ATTORNEYS

UNITED STATES PATENT OFFICE.

JOHN BEISWANGER, OF STEUBENVILLE, OHIO, ASSIGNOR TO GILL BROTHERS COMPANY, OF STEUBENVILLE, OHIO, A CORPORATION.

REINFORCED-GLASS ARTICLE OF MANUFACTURE.

1,212,174.     Specification of Letters Patent.     Patented Jan. 16, 1917.

Application filed March 3, 1915. Serial No. 11,859.

*To all whom it may concern:*

Be it known that I, JOHN BEISWANGER, a citizen of the United States of America, and resident of the city of Steubenville, county of Jefferson, and State of Ohio, have invented certain new and useful Improvements in Reinforced-Glass Articles of Manufacture, of which the following is a specification.

This invention relates to a new article of manufacture, comprising a structure formed from glass or any plastic substance of like nature and of concavo-convex form with a sheet of wire mesh or wire of any construction bent in substantially the same concavo-convex form and embedded into the glass while in a plastic condition, so that when the glass hardens the wire is integral with the glass, that is to say, it becomes an integral part of the glass structure. While I have described and claimed this embodiment of my invention as the same is formed of glass and the wire as a wire mesh, I do not intend to be limited to either of these, for the material of which the article is made may be other than glass, such as china, porcelain or other substance which is manufactured in a plastic state and thereafter hardened by well known processes, and as regards the wire mesh, this may be in any well known form of wire construction, even though it may not fully meet the requirement of the description of a wire mesh.

I have illustrated the invention in the accompanying drawings, referring to like parts by like numerals.

Figure I is a perspective view of the article showing the wire mesh as it appears from an inside view of the article. Fig. II is a longitudinal section taken through the center of the article and showing the wire adjacent the concave surface of the article. Fig. III is a like view showing the wire mesh adjacent the convex surface of the article.

By the numeral 1 the concavo-convex glass structure is indicated, 2 designating the concave surface thereof, and 3 the convex surface, while 4 indicates generally the wire mesh embedded in the glass.

5, Fig. II, shows the wire mesh embedded adjacent the concave surface 2, while 6, Fig. III, shows the wire mesh embedded adjacent the convex surface 3.

The article is useful as a light shield and reflector adapted to be suspended below a ceiling light. It is preferably made translucent and the wire reinforcement is adapted to give strength to the structure which is usually supported from the rim by suitable supporting means. Its use however is not limited to that stated as it may serve a variety of useful purposes.

What I claim is:

1. A hollow article of glassware of homogeneous character having a sheet of wire mesh embedded therein and lying wholly at one of the surfaces thereof, thereby providing an article of maximum strength without materially decreasing its capacity for transmitting light, and having smooth and uninterrupted outer and inner surfaces.

2. A lamp globe composed of homogeneous glassware and concavo-convex in form, said globe embodying a sheet of wire mesh embedded therein and lying wholly at the concave surface thereof, thereby providing a lamp globe of maximum strength without materially decreasing its capacity for transmitting light and having smooth and uninterrupted outer and inner surfaces.

Signed by me at the city of Steubenville, Ohio, this 25th day of January, 1915.

JOHN BEISWANGER.

Witnesses:
    J. HARVEY STRONG,
    D. R. ROOKE.

Copies of this patent may be obtained for five cents each, by addressing the "Commissioner of Patents, Washington, D. C."